(12) United States Patent
De Souza et al.

(10) Patent No.: US 9,251,420 B2
(45) Date of Patent: Feb. 2, 2016

(54) SYSTEM FOR MAPPING AND IDENTIFICATION OF PLANTS USING DIGITAL IMAGE PROCESSING AND ROUTE GENERATION

(71) Applicant: VALE S.A., Rio de Janeiro (BR)

(72) Inventors: Cleidson Ronald Botelho De Souza, Belém (BR); Schubert Ribeiro De Carvalho, Belém (BR); Pedro Walfir Martins e Souza Filho, Belém (BR); Nelson Monte de Carvalho Filho, Vila São Mamede (BR); Jean Marcel dos Reis Costa, Pass. Lauro Malcher (BR)

(73) Assignee: VALE S.A., Rio de Janeiro (BR)

( * ) Notice: Subject to any disclaimer, the term of this patent is extended or adjusted under 35 U.S.C. 154(b) by 186 days.

(21) Appl. No.: 14/161,504

(22) Filed: Jan. 22, 2014

(65) Prior Publication Data
US 2014/0205154 A1    Jul. 24, 2014

Related U.S. Application Data

(60) Provisional application No. 61/755,361, filed on Jan. 22, 2013.

(51) Int. Cl.
*G06K 9/00* (2006.01)
*G06T 7/00* (2006.01)

(52) U.S. Cl.
CPC .......... *G06K 9/00657* (2013.01); *G06T 7/0079* (2013.01); *G06T 2207/30188* (2013.01)

(58) Field of Classification Search
CPC .................. G06K 9/0063; G06K 2009/00644; G06K 9/00657; G06K 9/34; G06K 2209/17; G06T 7/0079; G06T 7/0081; G06T 2207/10032; G06T 2207/30188
See application file for complete search history.

(56) References Cited

U.S. PATENT DOCUMENTS

| 7,058,197 | B1 * | 6/2006 | McGuire et al. ............. 382/100 |
| 2014/0093138 | A1 * | 4/2014 | Naganuma et al. G06K 9/00657 |
| 2014/0369568 | A1 * | 12/2014 | Mangoubi et al. ........ G06T 7/00 |
| 2015/0186727 | A1 * | 7/2015 | Ma et al. ............ G06K 9/00657 |

OTHER PUBLICATIONS

French et al., "A 64-bit orthorectification algorithm using fixed-point arithemtic", Proc. SPIE vol. 8895: High-Performance Computing in Remote Sensing III, Oct. 2013, 6 pages.*
Goyens et al., "Evaluation of four atmospheric correction algorithms for MODIS-Aqua images over contrasted coastal waters", Remote Sensing of Environment, vol. 131, 2013, pp. 63-75.*

* cited by examiner

*Primary Examiner* — Andrew W Johns
(74) *Attorney, Agent, or Firm* — Arent Fox LLP

(57) ABSTRACT

The present invention relates to a system and method for mapping of plants. Homogenous and heterogeneous flora areas called clusters are identified in remote sensing images and routes to the plant clusters are generated. The plants are classified using morphological data from foliar images of plants present in the clusters.

31 Claims, 4 Drawing Sheets

SYSTEM FOR MAPPING AND IDENTIFICATION OF PLANTS USING DIGITAL IMAGE PROCESSING AND ROUTE GENERATION

CROSS-REFERENCE TO RELATED APPLICATION(S)

This application claims priority from U.S. Provisional Application No. 61/755,361, titled "Method For Semi-Automatic Mapping Of Plants Using Digital Image Processing And Automatic Route Marking" filed on Jan. 22, 2013, and which is incorporated herein by reference in its entirety.

BACKGROUND OF THE INVENTION

One of the most expensive and most important activities in a project involving modification of an environment (e.g., the building of roads, plants, industries, hydraulic enterprises, sanitary landfills, etc.) is the evaluation of the project's environmental impact.

Local legislation sets forth the minimum set of technical activities to be carried out during the environmental impact study. These prominently include the characterization of the environmental state or situation of the area, before implementing the project and the consideration of the biological medium and the natural ecosystems. An environmental impact study explores and studies the fauna and the flora of an area, particularly the species that are indicative of the environmental quality, of scientific and economic value, rare, and threatened with extinction, and identifies permanent conservation areas.

Therefore, it is extremely important to build tools that help the process of characterizing the flora systems in the regions of operation.

One factor which influences the cost of an environmental impact study, particularly the activity to identify the species of plants present in a certain cluster, is the route or path required to collect samples of these plants. A cluster of plants may cover an extensive area and access thereto may include obstacles, such as rivers, mountains, etc. Problems with itinerary and identifying the minimal paths have been investigated and applied in different areas [Solomon, 1987; Youssef et al., 2002; Pisinger & Ropke, 2007] (e.g., in motor car GPS appliances, for example, the driver receives suggestions of the quickest routes taking into account his current location and his destination). Similarly, the use of leaf images as a morphological tool to automate plant identification processes has been studied (Brill, 1968; Silva, 1996; Marine, 2000). However, in non-urban environments (such as forests) there are not always roads connecting the various points to be covered or researched and oftentimes there are obstacles which hinder the path.

Therefore, there is a further need for a system and method that generates routes to clusters of plants based on important factors such as the need to collect a variety of samples, time, effort, costs and risks related to consideration of the biological medium and the natural ecosystems.

BRIEF DESCRIPTION OF THE INVENTION

The following presents a simplified brief description of one or more aspects in order to provide a basic understanding of such aspects. This brief description is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, the present invention is an environmental impact evaluation system that assists in the process of characterizing flora ecosystems in regions of operation. In another aspect, the present invention provides a system and method implemented via a computer system that provides mapping and identification of plants using digital image processing and automatic routing to characterize flora ecosystems in regions of operation. In one aspect, a computer-implemented method according to the present invention includes the steps of identifying areas of homogenous and heterogenous flora through remote sensing images, generating routes to clusters of plants, and identifying plants through morphological data extracted from foliar images.

In another aspect, the present invention provides a system configured to perform the method, including a specially programmed computer device having components configured to perform aspects of the system provided by the present invention.

In yet another aspect, the present invention is directed to a method for mapping and identifying plants comprising receiving image data via a processor, the image data comprising remote sensing images from a remote sensing device, and storing the image data in a repository accessible by the processor; identifying, via the processor, one or more of homogenous and heterogeneous flora clusters in the remote sensing images; generating, via the processor, routes to the identified clusters; and identifying, via the processor, plants based on morphological data from a foliar image of plants present in the identified clusters.

In another aspect, the invention is a system for mapping and identifying plants comprising: a processor; a user interface functioning via the processor; and a repository accessible via the processor; wherein the processor is configured to: receive image data, the image data comprising remote sensing images from a remote sensing device, and store the image data in the repository; identify one or more of homogenous and heterogeneous flora clusters in the remote sensing images; generate routes to the identified clusters; and identify plants based on morphological data from a foliar image of plants present in the identified clusters.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION OF THE INVENTION

Figure 1:
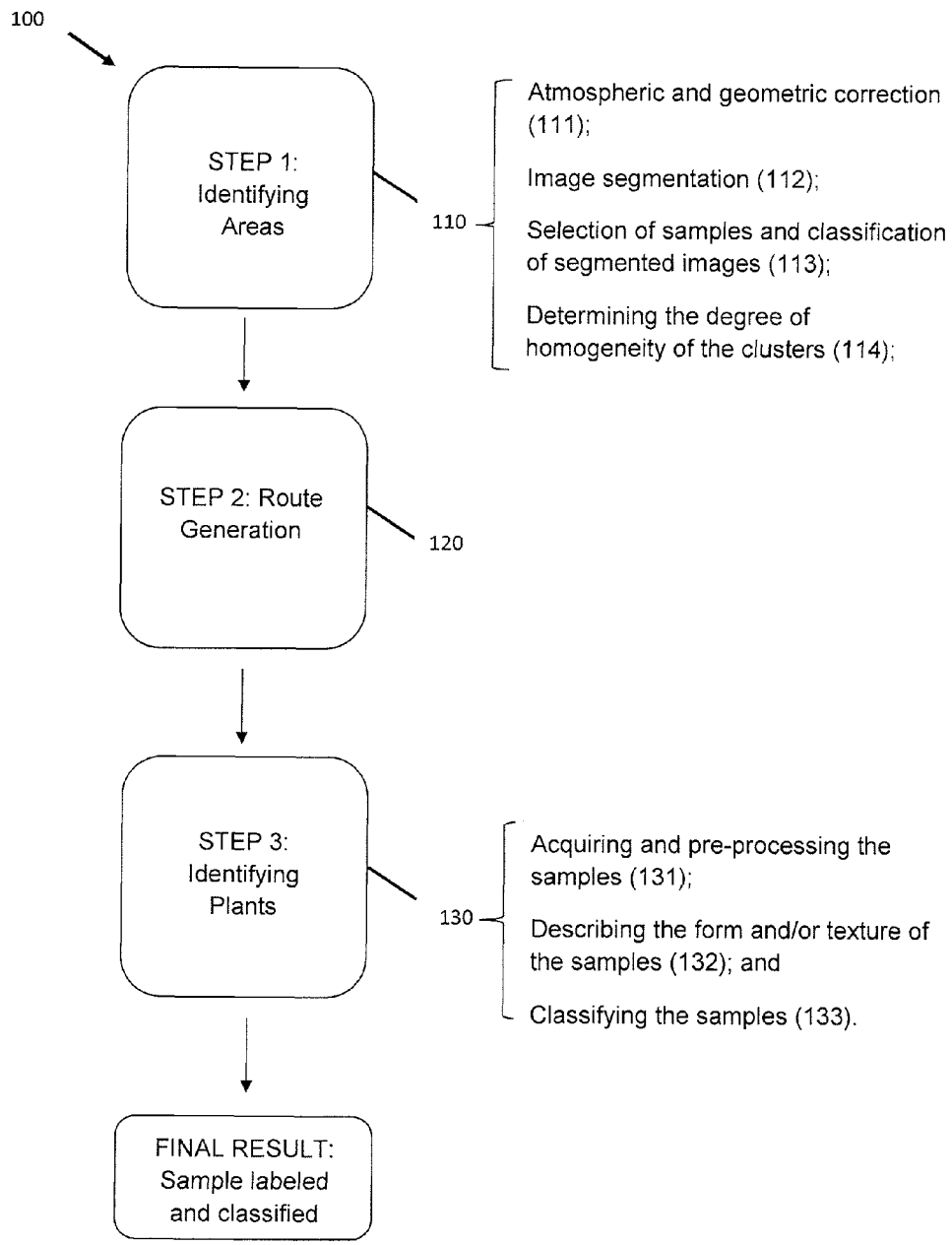
FIG. 1 is a flowchart of the method provided by the present invention.

The following detailed description does not intend to, in any way, limit the scope, applicability or configuration of the invention. More exactly, the following description provides the necessary understanding for implementing the exemplary modalities. When using the teachings provided herein, those skilled in the art will recognize suitable alternatives that can be used, without extrapolating the scope of the present invention.

The invention is useful for mapping and identification of plants using Digital Image Processing and Route Generation.

In one aspect, the invention includes identifying areas of homogenous and heterogenous flora through remote sensing images captured by satellites, cameras and other remote sensing devices. A computer system including a processor coupled to a remote and/or local repository accessible by the processor analyzes the remote sensing images and identifies various clusters which contain plants in the area to be characterized. The computer system computes the degree of homogeneity of each cluster. The degree serves as an indicator of the number of samples to be collected in each cluster, and consequently, the time, effort and cost required for characterizing the flora therein. Additionally, the analysis of the images enables the identification of the logistical infrastructure (such as, for example, roads, rivers, bridges, etc.) for access to each cluster of plants;

Another important aspect of the present invention is to generate routes to a cluster of plants so that different samples are collected, and the route will enable the time, effort, costs and risks of this activity to be reduced. Thus, based on the logistical infra-structure for access to each cluster of plants identified, for example, in the prior step, and considering the degree of homogeneity of each cluster, an algorithm for finding routes or paths is used to generate a set of routes to each cluster. Examples of these algorithms include, but are not limited to, Dijkstra's (Dijkstra, 1959), A* (Hart et al. 1968), and the Bestfirst Search (Pearl, 1984; Russel e Norvig, 2003) both of which are incorporated herein by reference. The generated routes may be used for the collection of samples of the plants in the cluster to be characterized. The generation of the paths or routes involves analysis of the remote sensing images. These images may be acquired or received by the computer system automatically or retrieved from a memory accessible by the computer system.

In yet another aspect, the invention includes identifying plants through morphological data extracted from foliar images. Based on data and information about the samples collected from the plants, for example, data and information stored in a local storage (e.g., memory, hard disk/drive, database) and/or received (or retrieved) from a remote storage (e.g., database, storage area network (SAN), server) by one or more processors of a computer system, description algorithms based on characteristic extraction techniques, such as those based on the Fourier Descriptors (Zhang, 2002) and Wavelet Descriptors (Antoine et al., 1997), may be utilized to identify the species/genus/family of the plant. In a description stage, a set of measurements is extracted from data or information relating to samples of classes (a class may represent a species, a genus or a plant family) with the aim of representing each class through attributes (e.g., descriptor attributes) or various characteristics capable of parameterizing its individuals. After description of the population in the description stage, individuals have their descriptor attributes compared in order to determine to which grouping or class they belong, which may be referred to as the classification stage of the samples. After the classification stage, comes the recognition stage, where the new individual should be classified in some of the classes determined previously. The final result of the recognition phase may be the name of the species, genus or plant family.

In one aspect, the present invention provides a computer-implemented method involving three steps:
STEP 1—Identifying the areas of homogenous and heterogenous flora through remote sensing images;
STEP 2—Route generation for locomotion to the clusters;
STEP 3—Identifying plants based on foliar morphology.
STEP 1—Identifying the Areas of Homogenous and Heterogenous Flora Through Remote Sensing Images Identifying the areas of homogenous and heterogenous flora through images can be performed by a sequence of steps described below.

1.1 Acquisition of Remote Sensing Images

Remote sensing images may be acquired with remote sensors (e.g., cameras and other image acquisition devices) installed on, for example, spatial platforms (e.g., satellites and space buses), aerial platforms (e.g., aircraft, ultralights and unmanned vehicles—VANTs) and land platforms (e.g., towers, tripods, easels). The images may also be acquired with, for example, nadir viewing (90° in relation to the land) or inclined viewing (angles under 90°), with spatial resolutions varying from 5 cm to 90 m, radiometric resolution from 1 byte to 32 bits and in spectrum ranges varying from near-ultraviolet (300 nm) to medium infrared (2500 nm). Land elevation data are also used. An image acquired by a remote sensor is stored in a local and/or remote repository which may include, for example, a memory, flash drive, floppy disk drive, a magnetic tape drive, an optical disk drive, a server, a storage area network, etc.

1.2 Atmospheric and Geometric Correction of High Spatial Resolution Images (Spatial Resolution Under 1 m)

The acquired remote sensing images need an atmospheric correction designed to reduce the effects of the atmosphere and solar illumination to recover the physical parameters of the earth's surface, namely, the spectral reflectance, emissivity and temperature of the targets under investigation. In one aspect, a processor coupled to a repository receives the acquired remote sensing images and applies an atmospheric correction algorithm such as the GW94-based algorithm with iterative procedure or the direct inversion approach by neural network (Goyens, C., C. Jamet, and T. Schroeder. "Evaluation of four atmospheric correction algorithms for MODIS-Aqua images over contrasted coastal waters." Remote Sensing of Environment 131 (2013): 63-75).

The processor may be configured to perform a process of orthorectification on the corrected images, the orthorectification process being designed to correct geometric distortions of the land in the three dimensions (latitude, longitude and elevation) by using the 64-bit orthorectification algorithm (Joseph C. French; Eric J. Balster; William F. Turri; A 64-bit orthorectification algorithm using fixed-point arithmetic. Proc. SPIE 8895, High-Performance Computing in Remote Sensing III, 88950K (Oct. 23, 2013); doi:10.1117/12.2032411.)

Because the remote sensing images have a high spatial resolution (i.e., a spatial resolution less than about 1 m), they include multispectral bands with lower spatial resolution than the panchromatic band (better spatial resolution). Therefore, the processor is configured to execute a fusion of the multispectral bands in the images with the panchromatic band in order to obtain multispectral images with better spatial resolution. The fusion can be executed by using different algorithms (for example, HIS, Gram-Schmidt Spectral Sharpening, wavelets, etc.).

1.3 Image Segmentation

The processor is further configured to perform image segmentation which is used to divide a given image into parts that correspond to real objects. Image segmentation includes a process of grouping pixels into regions that share properties in common (spectral, spatial or textural) [Haralick & Shapiro, 1985]. Said activity is a fundamental process in recognizing patterns, since subsequent processing will depend on the results of segmentation. The process of multiresolution image segmentation [Baatz & Schape, 2000; Burnett & Blaschke, 2003] can be used to determine the limits of each plant species and logistical infra-structure (roads, rivers, bridges, etc.).

1.4 Selection of Samples and Classification of Segmented Images

Next, the processor is configured to classify the segmented images. During the classification step, the processor uses data relating to samples or relating to knowledge stored in the memory. Thus, the processor is configured to use a process of classification by samples and a process of classification by knowledge.

Through the classification by samples to determine the class of a group of segments, it is necessary to collect sample objects (e.g., plants) for analysis to determine the intensity values of their properties (e.g. average reflectance of the spectral bands, brightness and Normalized Difference Vegetation Index—NDVI, image textures [Jensen, 1996]). The samples can be acquired by using, for example, a spectrometer, a scanner, a digital camera or a microscope.

Classification by samples uses a Fuzzy logic analysis applied over the nearest neighbor method [Benz et al. 2004]. This approach detects similar segments, by analyzing training samples. The expressions Fuzzy generate pertinence values that may vary from 0 to 1. A pertinence value 1 (one) indicates that the selected object fits perfectly into the class in question. The classes, for example, may include the name of plant species and/or their genders. In this regard, the distribution of probabilities of each class may be estimated, thereby enabling evaluation of the probability of each region belonging to each class, such that the region may be attributed to the greatest probability class.

The knowledge-based classification functions according to the fuzzy rules. These rules may be determined a priori, supported by user knowledge and other information stored in the repository, enabling the creation of thresholds for the desired classes. The thresholds and sets of fuzzy rules may also be combined with the logical operators and, or and not. Accordingly, different plant species may be identified. Additionally, it is also possible to identify the logistic structure of access to forests, such as, for example, dirt roads, asphalt roads, bridges, rivers, etc. The information about this logistic structure is stored in the memory for use in step 2 of this invention.

1.5 Determining the Degree of Homogeneity of the Clusters

The classification system of images oriented for recognizing objects had its development associated with the progress of image segmentation techniques. This technique aims to divide digital images into homogenous and spatially continuous regions, called objects (Flanders et al. 2003). Object-oriented classification methods combine the analysis of context, previously only possible during the visual interpretation process, with the quantitative spectral aspect of the pixel-by-pixel classification process (Walter, 2004).

Therefore, the object-oriented classification reduces the local spectral variation, inducing a better discrimination of the different mapped classes. However, although delimiting the object is crucial, a limitation is the definition of the Minimum Mapping Unit (MMU), that can be calculated using the pixel size or patches that include similar pixels, wherein the smallest area detected is within the range from 0.25 to 900 $m^2$. The algorithm for fixing MMU consists of finding all patches with size smaller than MMU and assigning them to the more frequent class in the pixels surrounding their perimeter and the smallest area possible to calculate is one pixel in an image.

Initially defined to control the process of visual interpretation (Saura, 2002), this parameter defines the minimum size of an entity to be mapped as a discrete area, calculated by the number of pixels included therein. Therefore, areas that are smaller than those pre-established will not be detected (Desclée et al. 2006).

This enables a reduction of the spatial and visual complexity of the information contained in the maps, especially when the information corresponding to the smallest portions is of little or no interest to the mapping proposal. To group the areas or classes described in the prior step (item 1.4), a random grouping system may be used that analyzes the effects of the MMU in configuring the landscape metrics and in composing the land coverage data. This analysis can be carried out using the "Modified Random Clusters (MRC)" method put forward by Saura e Marínez-Millán (2000).

This is a stochastic system, which enables the simulation of spatial stains and patterns with an irregular grid forming similar mosaics to those found in real landscapes. The MRC is a grid-based model that generates thematic spatial patterns on squared lattices, which may be used by the processor to determine the homogeneity of the clusters building regions with the same vegetation property (for example, tree color). The MRC algorithm is performed in a plurality of steps (e.g. four steps). In a first example step, (percolation map generation), the parameter that controls this step is the initial probability p. For each of the pixels of the image, a random number x ($0<x<1$), taken from a uniform distribution, is compared with p, and if $x<p$, then the pixel is marked. In the second step (Clusters identification), clusters composed of pixels marked in the first step are identified. A cluster may be defined as a set of pixels that have some neighborhood relation between them, for example, in a 4-neighborhood rule, pixels are considered to belong to the same cluster if they are adjacent horizontal or vertical, but not along a diagonal. In the third step (clusters type assignation), one type (class or category) is assigned to each of the clusters that were identified in the second step. The fourth and final step (filling in the image) is a key step of the algorithm in which the simulation makes it possible to obtain the regions with the necessary degree of spatial dependence, which may look patchy like homogenous regions.

STEP 2—Route Generation for Locomotion to the Clusters

Step 1 described an example approach that can be used to identify the logistic structure to access the area where the flora needs to be characterized. Additionally, this approach can identify sets of clusters where the samples need to be collected. In order to enable the identification of routes for collecting samples of plants in the clusters, the processor is configured to use a system to generate routes to the identified clusters to produce route data that is displayed in a graph on the user interface, wherein the graph is further based on one or more of the remote sensing images, a map of elevations, a classified map, a road map, and a layer representing obstacles. For example, one way is to represent this data based on different layers of images [Gonzalez & Woods, 1992]. Additionally, another approach that can be used is to represent the data as a graph, which can be generated from the following elements: original remote sensing image, map of elevations, classified map, road maps of the image, and layer representing the obstacles. Based on this data, the processor may generate a graph utilizing the following example steps:

(a) Each cluster of plants where the data need to be collected is transformed into a node of a graph;

(b) The degree of heterogeneity of a given cluster is attributed to the respective node as a weight therefore. Heterogeneity is measured by the standard deviation of the digital numbers of the pixel included in a patch of pixel (MMU). This degree of heterogeneity acts to identify the priorities that need to be given to the clusters where the data collection needs to be done;

(c) The logistical infrastructures identified which enable the traffic of persons and vehicles (for example, bridges, roads), are transformed into edges connecting the node of the graph;

(d) The edges have weights that are based on the distance to the destination, land elevation, land type, and on the obstacles along the path. These weights are entered by the user of the computer system in which this invention is implemented;

(e) If there is no logistical infra-structure linked directly to a certain cluster, a new node and new edges are added to the graph. This node is created along the edge which passes nearest to the cluster in question. In the meantime, the edge is created based on this new point up to the cluster in question. This new edge will be marked on the shortest route between these two points;

Based on this set of prior steps, a graph is obtained considering the logistical structure of access, the clusters where the samples need to be collected, the degree of heterogeneity of each cluster, the land elevation, and the obstacles along the paths. Once the graph is created, an algorithm can be used to generate the routes. Generally, adaptations of minimum path algorithms are used, such as, for example, the Dijkstra [Dijkstra, 1959], the A* (A-Estrela) (Hart et al. 1968), and the Bestfirst Search [Pearl, 1984; Russel e Norvig, 2003], and a person skilled in the art is able to apply it. The example algorithm may be used to generate the route in the graph given the initial location and path end being used as input data.

The starting point(s) is(are) manually identified based on a decision on the best point(s) based on where the person(s) in charge of collecting the data will depart from. In the meantime, the destination points will be the clusters where the samples need to be collected. In a variation of this invention, a cluster may be considered a point of destination, as well as a starting point. In this case, the person(s) in charge of collecting the data can carry out the collections at one cluster and then at another cluster.

Once the algorithm is executed, a path is generated between the initial node and the final node, represented by a chain list of contiguous pairs of Cartesian coordinates (X,Y). This path may indicate the set of routes which start from the point of origin of the data collection to one or more clusters of plants.

These routes are configured to be used as reference so that one or more persons can follow these routes to the respective clusters, for the effective collection of images of the plants in the region. These foliar images are stored in the repository for use in a subsequent step of this invention.

STEP 3—Identifying Plants Based on Leaf Morphology

Identifying plants by the morphological analysis of samples of foliar images using digital image processing techniques and pattern recognition is performed through a sequence of steps described below. In this case, it is assumed that there are foliar images extracted from the plants located in the clusters and identified in the prior steps of this invention.

3.1. Collection from Control Points in the Field (Geographic Coordinates and Altitude) to Validate the Classification of Images To determine the exact position of the trees and woods of the images, it is necessary to collect the geo-referenced data in the field, using differential high precision global navigation satellite systems (GNS), such as GPS (DGPS), Galileo, and GLONASS. These appliances and systems may be utilized to determine the coordinate of the different species of trees, as well as some woods, with decimetric accuracy, which facilitates recognition of the tree and the logistical structure of the image.

3.2. Recognizing the Plant Species Based on the Spatial and Spectral Characteristics of the Leaves The leaf sampling sites for extraction of the spatial and spectral characteristics are selected based on the results of the digital pre-classification of the remote sensing images. The parameter that refines the leaf sampling sites is the average reflectance of the patches of pixel, having as reference the characteristics of the objects generated defined by the degree of homogeneity of the objects. For each area where data will be collected, for example, 30 m×30 m portions are delimited based on the topographical gradient.

Each portion has its GNSS positioning recorded, the distribution of the species in the area and the withdrawal of samples of leaves from the tree tops.

Generally, the samples consist of whole green leaves, free of stains. The leaves may be stored in plastic bags and transported in a temperature controlled storage such as an iceboxe. A minimum amount of leaves are sufficient to construct a training database. This amount is determined according to the plants' availability in the forest. Normally an amount of ten (10) leaves may be sufficient to build a leaf dataset. The leaves can come from the same tree or from different trees of the same specie, gender or family.

In order to perform this stage of acquiring punctual spectral data and images, the following example acquisition instruments may be used: spectrum-radiometer which operates in the spectrum range of 325 to 2500 nanometers (nm); digital image acquisition devices (digital and analogical camera, smartphones, tablets, laptops, camcorders) operating in the resolution of 0.3 to 30 mega pixels.

Figure 4:
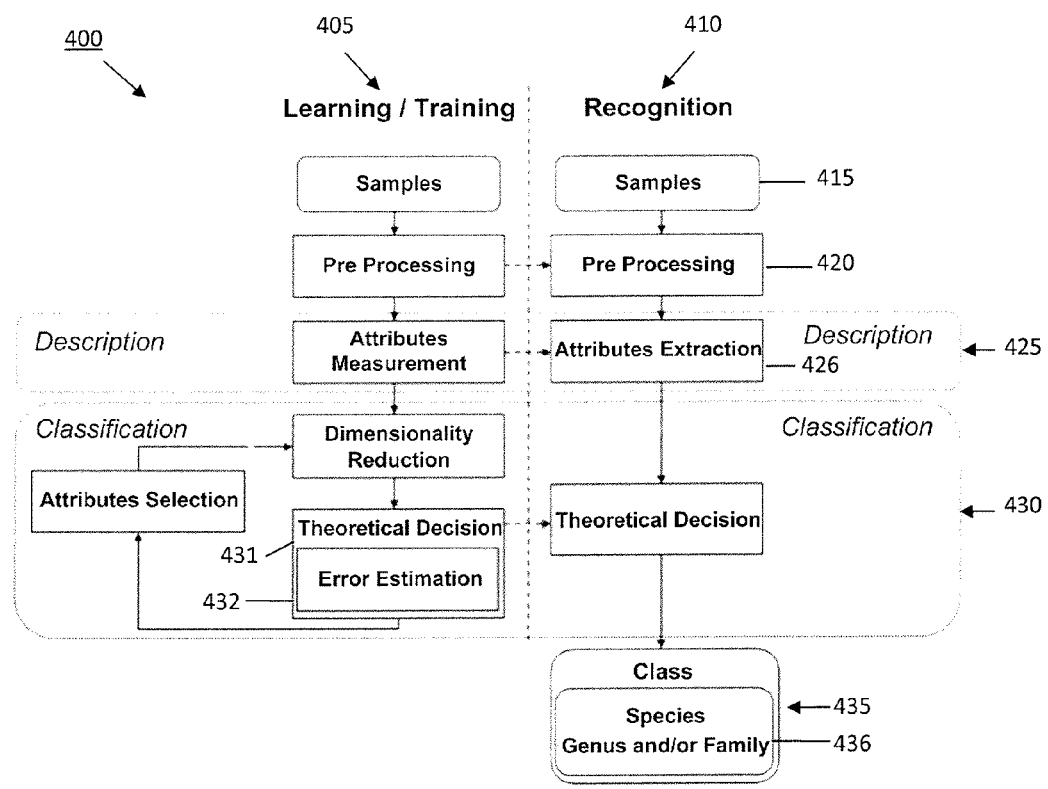
FIG. 4: is a block diagram of a plant recognition system, divided in accordance with the modes of operation: learning and recognition.

Recognizing plant species based on leaf morphology is done using the methodology described, for example, in FIG. 4, which illustrates an example system 400 for plant recognition based on the morphology of the leaves. The example stages may be divided according to various modes of operation, for example: learning (or training) 405 and recognition (identification and/or classification) 410. The task of recognizing plants 410 may be divided in, for example, three stages, which may include:

(1) Acquiring stage: Acquiring 415 and pre-processing the samples 420;

(2) Description stage: Describing the form and/or texture of the samples 425; and (3) Classification stage: Classifying the samples 430.

The acquiring stage 415, 420 may comprise collecting leaf samples in the field. Leaves can be collected according to the species availability, for example, samples from the same specie either from one tree or from many trees. The pre-processing stage 420 comprises the image acquisition and image processing to provide the leaf samples for identification and classification. The image acquisition is done by using any kind of acquisition equipment, such as digital cameras, scanners and/or microscopes. Image processing software, such as Matlab or Gimp, may be used to carry out the image processing stage. Overall, the goal is to pre-process leaf samples for extracting leaf shape and leaf venation information.

The description phase 425 is the phase in which a set of measures is extracted from samples of classes (representing a species, a genus or a plant family) with the aim of representing each class through attributes or characteristics ideally capable of parameterizing the behavior of its individuals. After describing the population, individuals may have their descriptor attributes compared in order to determine to which grouping or class they belong, thereby characterizing the classification stage 430 of the samples. According to FIGS. 1 and 4, operating in learning mode 405, the computer system designs each stage of the recognition 410, accordingly using samples for the training 405. In the recognition mode 410, the system receives an unknown sample 415 and identifies or describes it 425 and classifies it 430 according to the learning mode 405 definitions.

The description 425 is the stage of recognizing plants responsible for the extraction of characteristics 426 and representation of the objects by numerical attributes 426. In applying plant recognition, this numerical representation can be made with descriptors of forms and textures. Form descriptors are obtained through the measurement of a suitable number of characteristics of the objects, seeking to represent each morphological characteristic in a unique manner. Example form descriptors that can be used are descriptors such as area, perimeter, circularity (perimeter$^2$/area), eccentricity (length of longest axis/length of shortest axis) and orientation of longest axis (Yong et al., 1974). These descriptors will be used to discriminate distinct forms. Coupled to these descriptors are descriptors based on moments (Sonka et al., 1993), energy (Costa e Junior, 2000) and signatures of forms which are methods capable of reducing the complexity of the process of recognizing bidimensional objects, representing them in a one-dimensional manner through contour parameterization. The signatures of forms used are the contour-centroid distance signatures, of complex coordinates, of polar coordinates, by curvature, by tangent angle, by accumulative angle and by arc-length (Otterloo, 1991; Davies, 1997). To improve the efficiency of the discrimination, the form descriptors are used as input for more complex descriptors, such as the Signature Histogram (Squire e Caelli, 2000), the Curvature Scale Space (Mokhtarian, 1996), the Fourier Descriptors (Zhang, 2002) and the Wavelet Descriptors (Antoine et al., 1997), descriptors are also known as transforms. By using transforms, the descriptor attributes are extracted from the very segmented bidimensional object or in any type of contour parameterization. The transforms used in this invention may be based on the Fourier Transform (FFT) (Brill, 1968; Silva, 1996; Marine, 2000), inverse FFT (IFFT) the Short-Time Fourier Transform (Allen & Rabiner, 1977), the Multiresolution Fourier Transform (Calway, 1989) and the Wavelet Transform (Mallat, 1989).

The attributes obtained 426 in the description stage 425 are passed as input for the classification stage 430, which is one of the phases of recognition 410. If the descriptor determination stage 425 renders recognition unfeasible because good and sufficient discriminating characteristics are not extracted from the samples and/or the choice of a classification approach is unsuitable for the needs of the application and characteristics of the population, such circumstances may adversely affect the entire efforts of the prior phases of description 425, reduction and selection of the attributes, because classification 430 is the final decision stage in which a sample is labeled as belonging to a class or not 435.

In the classification 430, there are used techniques of minimum distance (Gonzalez e Woods, 1992), the Bayesian classifier (Duda e Hart, 1973), average error criteria (Vapnik, 1998), correlation, neural networks approaches (Jain et al., 1996) and Radial Basis Functions (RBF).

3.3. Evaluating the Classification of the Species and the Logistical Infra-Structure Classification evaluation 430 is carried out based on generating a theoretical decision 431 including an error matrix or confusion matrix 432, which consists of an effective system for conferring both commission errors and omission errors present in a classification [Congalton & Green, 1999; Foody, 2002]. In the first case, the error occurs when there is an inclusion of a sample in a category of which it is not a part. In the second case, the omission error is the opposite, that is, it occurs when there is an exclusion of a sample of a class of which it is truly a part. Thus, the error 432 is either the result of the exclusion from the correct category or the inclusion in a wrong category.

Kappa agreement indexes are also used [Cohen, 1960] and TAU [Ma & Redmond, 1995], and the Kappa index is obtained from the error matrix 432 and quantifies the accuracy of the classification, this is verified through agreement between the result of the classification 425 and the reference datum of the samples. The TAU index provides a relative precise and intuitive quantitative measurement on the accuracy of the classification, being a real agreement measurement (indicated by the diagonal elements of the confusion matrix) less the casual agreement (marginal distribution of the reference data and the a priori probabilities for each class).

The final result 435 may comprise the name of the species, genus and/or family 436 to which the labeled and classified sample belongs. Additionally, relevant information will be informed for greater clarity of recognition, identification and classification related to the analyzed plant, such as: informing whether the species is rare, is threatened with extinction or is protected by law in terms of picking or another factor, images of the trees to which the plant belongs, information on climate, images of the flowers it produces (when applicable), images of the fruits it produces (when applicable), in other words, information which facilitates and provides greater certainty to the recognition process. All this relevant information will be added to a multi-media database indicating, for example, whether or not the species is rare. Once the computer system recognizes the plant, this information will be given automatically provided to the user by the computer system.

Figure 2:
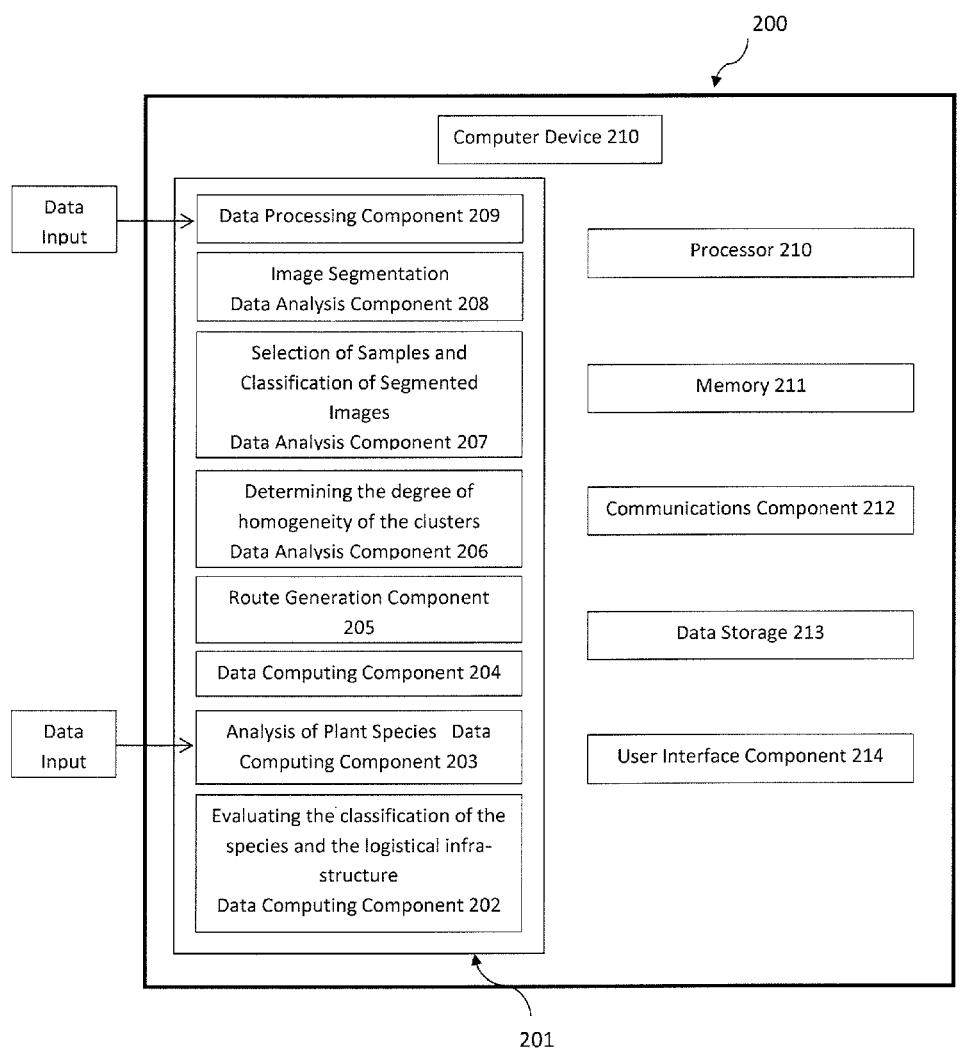
FIG. 2 is a system, including a computer device having components configured to perform aspects of the method provided by the present invention.

In particular, referring to FIGS. 1 and 2, a system 200 may be configured to perform aspects of the method 100 for the classification of the samples.

1) The system 200 may include a computer device 210 such as, for example, a PC, laptop or tablet, wherein the data may be entered or received (remote sensing images) and stored in a memory. The computer device 110 may execute steps 110, 120, and 130 of method 100, which is illustrated in FIG. 1.

The computer device 210, at step 111 of method 100, may process the data, e.g., via a data processing component 209, which may be software and/or hardware executing one or more algorithm or function, such as, a specially-programmed computer system, to perform the atmospheric and geometric correction of high spatial resolution images (spatial resolution under 1 m).

The computer device 210, at step 112 of method 100, may analyze the data entered, via a data analysis component 208, to divide a given image into parts that correspond to real objects. This step is called image segmentation. Also, image segmentation is the process of grouping pixels into regions that share properties in common (spectral, spatial or textural) [Haralick & Shapiro, 1985]. The image segmentaion activity may be a fundamental process that may be utilized for recognizing patterns, since subsequent processing will depend on the results of segmentation.

After the processing and the analysis of the data, the computer device 210, at step 113 of method 100, may select samples and perform classification of segmented images by executing the data analysis component 207. This classification can either use the process of classification by samples or the process of classification by knowledge.

The last stage of the STEP 1 is determining the degree of homogeneity of the clusters by the computer device 210, at step 114 of method 100, via a data analysis component 206. This stage enables a reduction of the spatial and visual complexity of the information contained in the maps, especially when the information corresponding to the smallest portions is of little or no interest to the mapping proposal.

2) System 200 further includes a mapping and identification component 201.

3) After example STEP 1, which describes an example approach that can be used to identify the logistic structure to access the area where the flora needs to be characterized, example STEP 2 is executed. STEP 2 enables the identification of routes for collecting samples of plants in the clusters, and uses a system to represent the clusters and the logistical infra-structure data. This step may be performed by the computer device 210, at step 120 of method 100. The generation of the route can be configured automatically via a route generation component 205, or manually based on instructions received through the user interface. These routes are used as reference so that one or more persons can follow these routes to the respective clusters, for the effective collection of leaves images of the plants in the region.

4) The computer device 210, at step 130 of method 100, which may execute the Identification of the plants based on foliar morphology, according to the approach selected by the user. Identifying plants by the morphological analysis of samples of foliar images using digital image processing techniques and patterns recognition may be performed through a sequence of steps described below.

The computer device 210, at step 131 of method 100 via a data computing component 204, receives the geo-referenced data in the field, using differential high precision GNSS (e.g., GPS (DGPS)), to determine the exact position of the trees and woods of the images that is necessary to collect.

The computer device 210, at step 132 of method 100, may execute a data computing component 203, which may analyze the plant species based on the spatial and spectral characteristics of the leaves, i.e., the leaf sampling sites for extraction of the spatial and spectral characteristics were selected based on the results of the digital pre-classification of the remote sensing images in the previous stage. To perform this stage of acquiring punctual spectral data and images, an input is received from a component such as a spectrum-radiometer which operates in the spectrum range of 325 to 2500 nanometers (nm); and an input from a component such as a digital image acquisition devices (digital and analogical camera, smartphones, tablets, laptops, camcorders) operating in the resolution of 0.3 to 30 mega pixels. Recognizing plant species based on foliar morphology is done using the methodology described in FIG. 5, for example.

The computer device 210, at step 133 of method 100, may execute a data computing component 202, which may evaluate the classification of the species and the logistical infra-structure based on an error matrix or confusion matrix. Kappa agreement indexes and TAU index are also used in this stage.

The final result will be the name of the species, genus and/or family to which the labeled and classified sample belongs. Additionally, relevant information will be informed for greater clarity of recognition, identification and classification related to the analyzed plant.

All of this relevant information will be recorded in a data computing component 204, such as a multi-media database.

The computer device 210 also may include a processor 210 for carrying out processing functions associated with one or more of the components and functions described herein. The processor 210 can include a single or multiple set of processors or multi-core processors. Moreover, the processor 210 can be implemented as an integrated processing system and/or a distributed processing system.

The computer device 210 also may include a memory 211, such as for storing data used herein and/or local versions of applications being executed by processor 210. The memory 211 can include any type of memory usable by a computer, such as random access memory (RAM), read only memory (ROM), tapes, magnetic discs, optical discs, volatile memory, non-volatile memory, and any combination thereof.

The computer device 210 also may include a communications component 212 that provides for establishing and maintaining communications with one or more entities utilizing hardware, software, and services as described herein. The communications component 212 may carry communications between components within the computer device, as well as between the computer device and external devices, such as devices located across a communications network and/or devices serially or locally connected to the computer device. For example, the communications component 212 may include one or more buses, and may further include transmit chain components and receive chain components associated with one or more transmitters and receivers, respectively, or one or more transceivers, operable for interfacing with external devices.

The computer device 210 also may include a data storage 213, which can be any suitable combination of hardware and/or software, that provides for mass storage of information, databases, and programs employed in connection with aspects described herein. For example, the data storage 213 may be a data repository for applications not currently being executed by the processor 210.

The computer device 210 also may include a user interface component 214 operable to receive inputs from a user of the computer device 210, and further operable to generate outputs for presentation to the user. The user interface component 214 may include one or more input devices, including but not limited to a keyboard, a number pad, a mouse or other pointing device such as a trachpad, a touch-sensitive display, a navigation key, a function key, a microphone, a voice recognition component, any other mechanism capable of receiving an input from a user, or any combination thereof. Further, the user interface component 214 may include one or more output devices, including but not limited to a display, a speaker, a haptic feedback mechanism, a printer, any other mechanism capable of presenting an output to a user, or any combination thereof.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

The present invention may be implemented using hardware, software, or a combination thereof and may be implemented in one or more computer systems or other processing systems. In one aspect, the invention is directed toward one or more computer systems capable of carrying out the functionality described herein. An example of such a computer system 300 is shown in FIG. 3.

Figure 3:
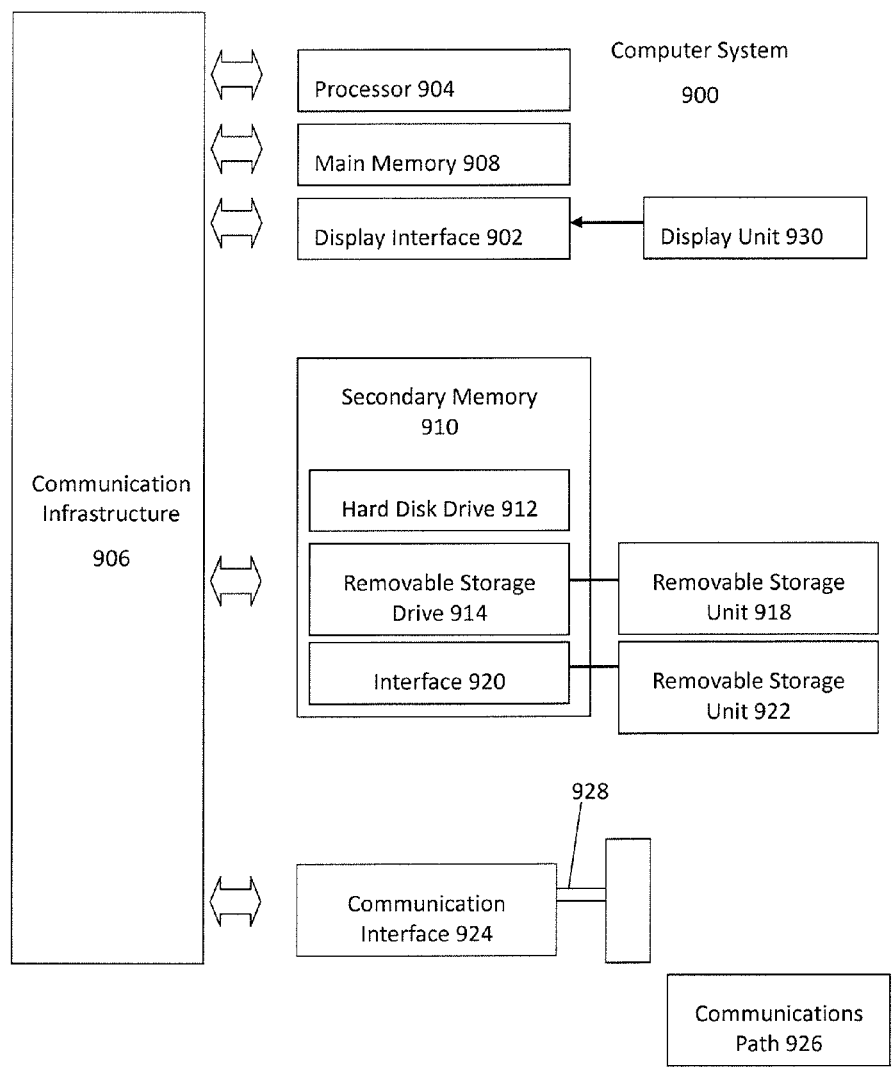
FIG. 3 presents an exemplary system diagram of various hardware components and other features, for use in accordance with aspects of the present invention.

FIG. 3 presents another system in accordance with an aspect of the present invention that can execute the method of the present invention. Aspects of the present invention may be implemented using hardware, software, or a combination thereof and may be implemented in one or more computer systems or other processing systems. In one exemplary variation, aspects of the invention are directed toward one or more computer systems capable of carrying out the functionality described herein. An example of such a computer system 900 is shown in FIG. 3.

Computer system 900 includes one or more processors, such as processor 904. The processor 904 is connected to a communication infrastructure 906 (e.g., a communications bus, cross-over bar, or network). Various software aspects are described in terms of this example computer system. After reading this description, it will become apparent to a person skilled in the relevant art(s) how to implement aspects of the invention using other computer systems and/or architectures.

Computer system 900 may include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc., which is read by and written to removable storage drive 914. As will be appreciated, the removable storage unit 918 includes a computer usable storage medium having stored therein computer software and/or data.

In alternative aspects, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928, which may be electronic, electromagnetic, optical or other signals capable of being received by communications interface 924. These signals 928 are provided to communications interface 924 via a communications path (e.g., channel) 926. This path 926 carries signals 928 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 980, a hard disk installed in hard disk drive 970, and signals 928. These computer program products provide software to the computer system 900. Aspects of the invention are directed to such computer program products.

Computer programs (also referred to as computer control logic) are stored in main memory 908 and/or secondary memory 910. Computer programs may also be received via communications interface 924. Such computer programs, when executed, enable the computer system 900 to perform various features in accordance with aspects of the present invention, as discussed herein. In particular, the computer programs, when executed, enable the processor 910 to perform such features. Accordingly, such computer programs represent controllers of the computer system 900.

In variations where aspects of the invention are implemented using software, the software may be stored in a computer program product and loaded into computer system 900 using removable storage drive 914, hard drive 912, or communications interface 920. The control logic (software), when executed by the processor 904, causes the processor 904 to perform the functions in accordance with aspects of the invention as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the invention are implemented using a combination of both hardware and software as shown in FIG. 4 which provides a diagram of an automatic plant recognition system, divided in accordance with the modes of operation: learning/training and recognition.

The present invention provides many advantages over conventional systems including the integration of methods that enable a combination of macro-level up to micro-level techniques. This combination of using micro-to-macro level analysis techniques is what offers competitive advantages. Notably, significant advantages of the present invention include:

1. Homogeneity: a single system can be used for planning the data collection (steps 1 and 2 of this invention) and for the analysis of the data collected (step 3 of this invention).

2. Practicality: step 2 foresees the use of a device to capture foliar images (such as, for example a cellphone, Smartphone, tablet, phablet, or a camera), whereby eliminating a large volume of items generally used to collect data in the field and even to move the plants collected to the herbarium.

3. Speed: the use of sensory imaging which give a high level vision of the area associated to the automatic route generation for the collection of data allows the area to be analyzed can be evaluated in a speedier manner.

4. Reduced cost: With greater speed in analyzing a certain area, the cost necessary to do so is also lessened. The reduction in cost is also due to the reduction in the items needed to be taken to the field.

The invention claimed is:

1. A method for mapping and identifying plants comprising:
   receiving image data via a processor, the image data comprising remote sensing images from a remote sensing device, and storing the image data in a repository accessible by the processor;
   identifying, via the processor, one or more of homogenous and heterogeneous flora clusters in the remote sensing images;
   generating, via the processor, routes to the identified clusters; and
   identifying, via the processor, plants based on morphological data from a foliar image of plants present in the identified clusters.

2. A method, according to claim 1, wherein the remote sensing images are high spatial resolution images, the method further comprising:
   correcting, via the processor, the high spatial resolution images for atmospheric and geometric effects;
   segmenting, via the processor, the remote sensing images;
   receiving, via the processor, sample data related to samples of plants and classifying the segmented images based on the sample data; and
   determining, via the processor, a degree of homogeneity of the clusters.

3. A method, according to claim 2, wherein the step of segmenting the images further comprises a process of orthorectification of the segmented images, the process of orthorectification correcting geometric distortions of the land in three dimensions using one or more algorithms.

4. A method, according to claim 3, wherein the one or more algorithms are selected from HIS, Gram-Schmidt Spectral Sharpening and wavelets.

5. A method, according to claim 2, wherein the step of segmenting the images comprises a process of grouping pixels into regions that share properties in common and determining a limit of each vegetal species and a logistical infrastructure.

6. A method, according to claim 2, wherein in the step of classifying the segmented images comprises a process of classification by samples, a process using Fuzzy logic applied over a nearest neighbor method or a process of classification by knowledge based on Fuzzy logic rules.

7. A method, according to claim 2, wherein the step of determining the degree of homogeneity of the clusters comprises using MMU and Modified Random Clusters (MRC).

8. A method according to claim 7, wherein a smallest area detected is within a range of about 0.25 to about 900 m².

9. A method, according to claim 1, further comprising acquiring the remote sensing images with remote sensors installed on spatial platforms, aerial platforms or land platforms.

10. A method, according to claim 1, further comprising acquiring the remote sensing images with nadir viewing with 90° in relation to land or inclined viewing with angles under 90°, the acquired remote sensing images having spatial resolutions from about 5 cm to about 90 m, radiometric resolution from about 1 byte to about 32 bits and in spectrum ranges from about near-ultraviolet (300 nm) to about medium infrared (2500 nm).

11. A method, according to claim 1, wherein the step of generating routes to the identified clusters comprises identifying, via the processor, routes for collecting samples of plants in the clusters and identifying logistical infra-structure data.

12. A method, according to claim 1, wherein the step of generating routes to the identified clusters produces route data represented in different layers of images.

13. A method, according to claim 1, wherein the step of generating routes to the identified clusters produces route data represented in a graph, wherein the graph is further based on one or more of the remote sensing images, a map of elevations, a classified map, a road map, and a layer representing obstacles.

14. A method, according to claim 1, wherein the processor uses an algorithm to generate routes to achieve one or more of an optimum variety of samples, a minimum time, a minimum effort, a minimum cost and a minimum risk.

15. A method, according to claim 14, wherein the algorithm is Dijkstra's, A* or Bestfirst Search.

16. A method, according to claim 1, wherein the processor generates a route between an initial node and a final node.

17. A method, according to claim 1, wherein the step of generating routes to the identified clusters comprises generating a set of routes which start from a point of origin to one or more of the clusters.

18. A method, according to claim 17, wherein the generated set of routes is configured for locomotion to one or more of the clusters.

19. A method, according to claim 1, wherein the processor receives sample data related to samples of plants and wherein the step of identifying the plants comprises applying, via the processor, digital image processing and pattern recognition techniques comprising:
receiving, via the processor, field data including control points comprising geographic coordinates and altitude for validating a classification of images;
recognizing, via the processor, a plant species based on spatial and spectral characteristics of leaves of the plants; and
determining, via the processor, a classification of the plant species and a logistical infra-structure.

20. A method, according to claim 19, wherein the step of receiving field data comprises receiving field data from a differential high precision GPS (DGPS).

21. A method, according to claim 19, wherein in the step of recognizing the plant species comprises delimiting, via the processor, 30×30 m portions of an area where data will be collected based on a topographical gradient.

22. A method, according to claim 21, wherein the remote sensing device is selected from one or more of a spectrum-radiometer which operates in the spectrum range of about 325 to about 2500 nanometers (nm) and a digital image acquisition device operating with a resolution of about 0.3 to about 30 mega pixels.

23. A method, according to claim 19, wherein the samples of plants comprise whole green leaves, free of stains.

24. A method, according to claim 19, wherein the step of recognizing the plant species is based on foliar morphology.

25. A method, according to claim 19, wherein the step of determining a classification of the plant species and the logistical infra-structure comprises generating, via the processor, an error matrix or a confusion matrix, using a method for conferring commission errors and omission errors present in a classification.

26. A system for mapping and identifying plants comprising:
a processor;
a user interface functioning via the processor; and
a repository accessible via the processor;
wherein the processor is configured to:
receive image data, the image data comprising remote sensing images from a remote sensing device, and store the image data in the repository;
identify one or more of homogenous and heterogeneous flora clusters in the remote sensing images;
generate routes to the identified clusters; and
identify plants based on morphological data from a foliar image of plants present in the identified clusters.

27. A system, according to claim 26, wherein the remote sensing images are high spatial resolution images, the system being further configured to:
correct the high spatial resolution images for atmospheric and geometric effects;
segment the remote sensing images;
receive sample data related to samples of plants and classify the segmented images based on the sample data; and
determine a degree of homogeneity of the clusters.

28. A system, according to claim 26, wherein the step of generating routes to the identified clusters comprises identifying, via the processor, routes for collecting samples of plants in the clusters and identifying logistical infra-structure data.

29. A system, according to claim 26, wherein the processor is further configured to generate routes to the identified clusters to produce route data that is represented in different layers of images.

30. A system, according to claim 26, wherein the processor is further configured to generate routes to the identified clusters to produce route data that is represented in a graph, wherein the graph is further based on one or more of the remote sensing images, a map of elevations, a classified map, a road map, and a layer representing obstacles.

31. A system, according to claim 26, wherein the processor is configured to receive sample data related to samples of plants and wherein the processor is configured to identify the plants by applying digital image processing and pattern recognition techniques, the processor being further configured to:
receive field data including control points comprising geographic coordinates and altitude for validating a classification of images;
recognize a plant species based on spatial and spectral characteristics of leaves of the plants; and
determine a classification of the plant species and a logistical infra-structure.

* * * * *